(12) United States Patent
Weber et al.

(10) Patent No.: US 7,265,172 B2
(45) Date of Patent: Sep. 4, 2007

(54) POLYCARBONATE STYRENE COPOLYMER BLENDS WITH IMPROVED PROPERTIES

(75) Inventors: Martin Weber, Maikammer (DE); Xaver Hopfenspirger, Hassloch (DE); Reinhard Jakobi, Maxdorf (DE); Walter Heckmann, Weinheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 214 days.

(21) Appl. No.: 10/510,478

(22) PCT Filed: Apr. 8, 2003

(86) PCT No.: PCT/EP03/03612

§ 371 (c)(1), (2), (4) Date: Oct. 7, 2004

(87) PCT Pub. No.: WO03/085047

PCT Pub. Date: Oct. 16, 2003

(65) Prior Publication Data
US 2005/0159546 A1    Jul. 21, 2005

(30) Foreign Application Priority Data
Apr. 11, 2002    (DE) .............................. 102 16 071

(51) Int. Cl.
C08L 69/00    (2006.01)
C08L 51/04    (2006.01)

(52) U.S. Cl. .................. 524/141; 524/321; 525/67; 525/133; 525/148

(58) Field of Classification Search ............... None
See application file for complete search history.

(56) References Cited

U.S. PATENT DOCUMENTS

| | | | |
|---|---|---|---|
| 4,463,130 A | 7/1984 | Serini et al. | |
| 4,672,676 A | 6/1987 | Linger | |
| 4,766,165 A | 8/1988 | Kress et al. | |
| 5,272,193 A | 12/1993 | Fuhr et al. | |
| 6,423,767 B1 | 7/2002 | Weber et al. | |
| 6,894,112 B1 * | 5/2005 | Weber et al. | 525/65 |

FOREIGN PATENT DOCUMENTS

| | | | |
|---|---|---|---|
| DE | 3812052 | * | 10/1989 |
| DE | 19956539 | * | 5/2001 |
| DE | 199 59420 | | 6/2001 |
| EP | 363 608 | | 4/1990 |
| EP | 558 266 | | 9/1993 |
| EP | 1 153 981 | | 11/2001 |
| WO | 01/42361 | | 6/2001 |

OTHER PUBLICATIONS

I. Bottenbruch; Kunststoff-Handbuch, Band 3/2, Technische Polymer-Blends, HanserVerlag, Muenchen (1993), 178-184.
Martin et al., Polymer, Elsevier Sci., Publishers B.V., 42, Nr. 6 (2001), 2463-2478.
D.W. Jin et al., Journal Appl. Poly. Sci., 69, 533 (1998).
Deveaux et al., "J. Polym. Sci.", Polym. Phys. Ed., 20, 1901 (1982).

* cited by examiner

Primary Examiner—David J. Buttner
(74) Attorney, Agent, or Firm—Novak Druce & Quigg, LLP

(57) ABSTRACT

Thermoplastic molding composition comprising components A, B, C and D and, if appropriate, E, F, G and H,
A) from 1 to 97.5% by weight of at least one aromatic polycarbonate A,
B) from 1 to 97.5% by weight of at least one graft polymer B made from b1) from 40 to 80% by weight of a graft base made from an elastomeric polymer B1, b2) from 20 to 60% by weight of a graft B2 made from b21) from 60 to 95% by weight of styrene or of substituted styrenes B21 and b22) from 5 to 40% by weight of at least one unsaturated nitrile B22,
C) from 1 to 97.5% by weight of at least one thermoplastic copolymer C made from c1) from 60 to 85% by weight of styrene or of substituted styrenes C1 or mixtures thereof and c2) from 15 to 40% by weight of at least one unsaturated nitrile C2,
D) from 0.5 to 50% by weight of at least one copolymer D, obtainable via reaction of d1) from 5 to 95% by weight of at least one thermoplastic methacrylate polymer D1 containing at least one type of functional groups selected from epoxy, carboxy, hydroxy, anhydride and oxazoline, with d2) from 5 to 95% by weight of at least one thermoplastic polyester D2,
E) from 0 to 40% by weight of at least one filler E,
F) from 0 to 2% by weight of at least one organic acid F,
G) from 0 to 25% by weight of at least one halogen-free phosphorus compound G,
H) from 0 to 45% by weight of other additives H.

21 Claims, No Drawings

POLYCARBONATE STYRENE COPOLYMER BLENDS WITH IMPROVED PROPERTIES

The invention relates to thermoplastic molding compositions comprising components A, B, C and D, and also, where appropriate, E, F, G and H, the entirety of which gives 100% by weight:
A) from 1 to 97.5% by weight of at least one aromatic polycarbonate A,
B) from 1 to 97.5% by weight of at least one graft polymer B made from
  b1) from 40 to 80% by weight of a graft base made from an elastomeric polymer B1 based on alkyl acrylates having from 1 to 8 carbon atoms in the alkyl radical, on ethylene-propylene, on dienes, or on siloxanes, and having a glass transition temperature below 0° C.,
  b2) from 20 to 60% by weight of a graft B2 made from
  b21) from 60 to 95% by weight of styrene or of substituted styrenes B21 of the formula I

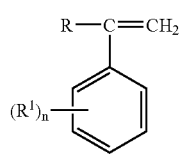

where R is $C_1$-$C_8$-alkyl or hydrogen and $R^1$ is $C_1$-$C_8$-alkyl and n is 1, 2 or 3, or a mixture of these, and
  b22) from 5 to 40% by weight of at least one unsaturated nitrile B22,
C) from 1 to 97.5% by weight of at least one thermoplastic copolymer C made from
  c1) from 60 to 85% by weight of styrene or of substituted styrenes C1 of the formula I, or a mixture of these compounds, and
  c2) from 15 to 40% by weight of at least one unsaturated nitrile C2,
D) from 0.5 to 50% by weight of at least one copolymer D, obtainable via reaction of
  d1) from 5 to 95% by weight of at least one thermoplastic methacrylate polymer D1 containing at least one type of functional groups selected from epoxy, carboxy, hydroxy, anhydride and oxazoline, with
  d2) from 5 to 95% by weight of at least one thermoplastic polyester D2,
E) from 0 to 40% by weight of at least one filler E,
F) from 0 to 2% by weight of at least one organic acid F,
G) from 0 to 25% by weight of at least one halogen-free phosphorus compound G,
H) from 0 to 45% by weight of other additives H.

The invention further relates to a process for preparing the molding compositions, to the use of the molding compositions for producing moldings, fibers, or films, and to these moldings, fibers, and films. Finally, the invention relates to the use of the abovementioned copolymers D as compatibilizer in molding compositions in which polycarbonates, graft polymers and styrene copolymers are present, and relates to the copolymers D per se.

Polymer blends made from polycarbonate and from styrene polymers, such as ABS (acrylonitrile-butadiene-styrene polymers) or ASA (acrylonitrile-styrene-acrylate polymers) have excellent mechanical properties. The skilled worker will find details in L. Bottenbruch (ed.), Kunststoff-Handbuch, Vol. 3/2 "Technische Polymer-Blends", Hanser-Verlag, Munich, 1993, for example. These molding compositions are therefore used in a very wide variety of sectors, such as automotive construction, in the construction of buildings, for office machinery, and also in electrical devices and in household appliances.

For the production of large-surface-area moldings a low coefficient of thermal expansion (CTE) is desirable. The coefficient of thermal expansion can be lowered by adding fillers or reinforcing materials to thermoplastic molding compositions.

High stiffness and good impact strength is required in particular for large moldings, e.g. bodywork parts.

Polymer blends can be rendered flame-retardant by adding—in particular halogen-free—flame retardants, so that the burning times pass the fire test to the UL-94 Standard of Underwriters' Laboratories Inc. (Melville, Long Island, N.Y. 11746, USA). Particularly suitable flame retardants are organophosphorus compounds, such as phosphoric esters or phosphine oxides. Many patent applications disclose molding compositions provided with these flame retardants, examples being EP-A 522 397, 103 230, 174 493, 206 058, 363 608 and 558 266.

The morphology of polycarbonate/styrene copolymer blends is very greatly influenced by the processing conditions, such as the melt temperatures and the shear rates during injection molding. In particular in the case of large moldings, this can lead to anisotropic properties, e.g. anisotropic mechanical properties.

This undesired effect is further exacerbated if the blends comprise fillers or reinforcing materials, e.g. glass fibers.

D. W. Jin et al., J. Appl. Polym. Sci. 69,533 (1998) discloses that addition of polymethyl methacrylate (PMMA) can improve the compatibility of the blend components in polycarbonate/ABS blends.

DE-A 199 59 420 describes polycarbonate/styrene copolymer blends which comprise a reaction product made from reactive styrene polymers—i.e. from styrene copolymers containing epoxy, hydroxy, carboxy or oxazoline monomers—and from polyesters. Some applications require a further improvement in the anisotropy properties of these blends; in particular in the case of large moldings, it would be desirable to reduce susceptibility to delamination (susceptibility to flaking-off of polymer material, especially in the case of large moldings). Delamination makes the molding unusable.

EP-A 1 153 981 discloses blends made from polycarbonate and vinyl copolymers, such as polystyrene, SAN (styrene-acrylonitrile copolymer) or ABS. These blends comprise compatibilizers, obtainable from vinyl monomers, such as styrene or acrylonitrile, or from acrylates or from olefins, and from hydroxy-containing monomers, such as hydroxystyrenes. The blends also comprise transesterification catalysts. However, J. Deveaux et al., J. Polym. Sci., Polym. Phys. Ed., 20, 1901 (1982) discloses that hydroxy-containing products react with polycarbonates in the melt—i.e. during the production of the blends from the blend components—this reaction being difficult to control.

It is an object of the present invention to eliminate the disadvantages described. A particular object was to provide polycarbonate/styrene copolymer blends which have high stiffness and good toughness.

Another object was to reduce the effect of the processing conditions on the properties of the moldings, and to reduce anisotropy, in particular of mechanical properties. This should also apply to filled molding compositions.

Finally, the susceptibility to delamination of the moldings produced from the molding compositions should be reduced.

All of the abovementioned improvements should be achieved simultaneously, i.e. one feature should not be obtained at the expense of another.

We have found that this object is achieved by means of the thermoplastic molding compositions defined at the outset, by a process for their preparation, and by their use for producing moldings, fibers, or films, and also by means of these moldings, fibers, and films. The use of the abovementioned copolymers D as compatibilizer in molding compositions in which polycarbonates, graft polymers and styrene copolymers are present has also been found, as have the copolymers D per se.

Preferred embodiments are given in the subclaims.

The molding compositions of the invention differ from the molding compositions of the prior art in the chemical nature of the compatibilizer, here component D. They differ from DE-A 199 59 420 in that the compatibilizer is obtainable from reactive methacrylate polymer (instead of reactive styrene copolymer).

The preferred components A to H are explained below.

Component A

The amount of component A present in the molding compositions of the invention is from 1 to 97.5% by weight, preferably from 10 to 94% by weight, in particular from 20 to 92.5% by weight.

Halogen-free polycarbonates are preferably used as component A. Examples of suitable halogen-free polycarbonates are those based on biphenols of the formula II

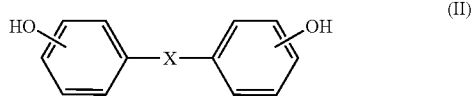

where X is a single bond, $C_1$-$C_3$-alkylene, $C_2$-$C_3$-alkylidene, $C_3$-$C_6$-cycloalkylidene, or else —S— or —$SO_2$—.

Examples of preferred biphenols of the formula II are hydroquinone, resorcinol, 4,4'-dihydroxyphenol, 2,2-bis-(4-hydroxyphenyl)propane, 2,4-bis(4-hydroxyphenyl)-2-methylbutane and 1,1-bis(4-hydroxyphenyl)cyclohexane. Particular preference is given to 2,2-bis(4-hydroxyphenyl) propane and 1,1-bis(4-hydroxyphenyl)cyclohexane, and also to 1,1-bis(4-hydroxyphenyl)-3,3,5-trimethylcyclohexane.

Either homopolycarbonates or copolycarbonates are suitable as component A, and preference is given to the copolycarbonates of bisphenol A, as well as to bisphenol A homopolycarbonate.

Suitable polycarbonates may have branching in a known manner, preferably via incorporation of from 0.05 to 2.0 mol %, based on the entirety of the biphenols used, of at least trifunctional compounds, for example those having three or more than three phenolic OH groups.

Polycarbonates which have proven particularly suitable are those whose relative viscosities $\eta_{rel}$ are from 1.10 to 1.50, in particular from 1.20 to 1.40. This corresponds to average molecular weights $M_w$ (weight-average) of from 10,000 to 200,000, preferably from 20,000 to 80,000, or viscosity numbers of from 20 to 100 ml/g, in particular from 40 to 80 ml/g, measured to DIN 53727 on a 0.5% strength by weight solution in methylene chloride at 23° C.

The biphenols of the general formula II are known per se or can be prepared by known methods.

One method of preparing the polycarbonates is to react the biphenols with phosgene by the interfacial process, or with phosgene by the homogeneous-phase process (known as the pyridine process), and an appropriate amount of known chain terminators can be used in a known manner in each case to achieve the desired viscosity number and therefore the molecular weight.

For polydiorganosiloxane-containing polycarbonates, see DE-A 33 34 782, for example.

Examples of suitable chain terminators are phenol, p-tert-butylphenol, and also long-chain alkylphenols, such as 4-(1, 3-tetramethylbutylbutyl)phenol, as in DE-A 28 42 005, or monoalkylphenols or dialkylphenols having a total of from 8 to 20 carbon atoms in the alkyl substituents, as in DE-A 35 06 472, for example p-nonylphenol, 3,5-di-tert-butylphenol, p-tert-octylphenol, p-dodecylphenol, 2-(3,5-dimethylheptyl) phenol and 4-(3,5-dimethylheptyl)phenol.

For the purposes of the present invention, a halogen-free polycarbonate is a polycarbonate built up from halogen-free biphenols, from halogen-free chain terminators and, where appropriate, from halogen-free branching agents. Any minor ppm content here of hydrolyzable chlorine, resulting, for example, from the preparation of the polycarbonates with phosgene in the interfacial process, is not to be regarded as meriting the term halogen-containing for the purposes of the present invention. Polycarbonates of this type with ppm contents of hydrolyzable chlorine are halogen-free polycarbonates for the purposes of the present invention.

Component B

The amount of component B is present in the molding compositions of the invention from 1 to 97.5% by weight, preferably from 1.5 to 50% by weight, in particular from 2 to 45% by weight. Component B is preferably halogen-free.

The graft polymer B has been built up from b1) from 40 to 80% by weight, preferably from 50 to 70% by weight, of a graft base made from an elastomeric polymer B1 based on alkyl acrylates having from 1 to 8 carbon atoms in the alkyl radical, on ethylene-propylene, on dienes or on siloxanes, and having a glass transition temperature below 0° C., b2) from 20 to 60% by weight, preferably from 30 to 50% by weight, of a graft B2 made from b21) from 60 to 95% by weight, preferably from 70 to 85% by weight, of styrene or of substituted styrenes B21 of the formula I

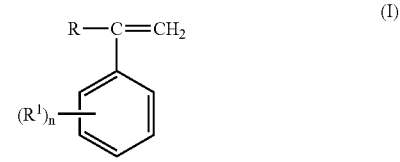

where R is $C_1$-$C_8$-alkyl, preferably methyl or ethyl, or hydrogen, and $R^1$ is $C_1$-$C_8$-alkyl, preferably methyl or ethyl, and n is 1, 2 or 3, or a mixture of these, b22) from 5 to 40% by weight, preferably from 15 to 30% by weight, of at least one unsaturated nitrile B22, preferably acrylonitrile or methacrylonitrile or a mixture of these, and b23) from 0 to 10% by weight of at least one other monomer B23 capable of free-radical polymerization.

Polymers which may be used for the graft base B1 are those whose glass transition temperature is below 0° C., preferably below −10° C., particularly preferably below −20° C. Examples of these are elastomers based on $C_1$-$C_8$-alkyl esters of acrylic acid, if desired containing other comonomers, based on ethylene-propylene, based on dienes, such as butadiene, or based on siloxanes. The resultant graft rubbers are then, respectively, ASA rubbers, AES rubbers, ABS rubbers and polysiloxane rubbers.

It is also possible, of course, to use mixtures of the $C_{1-8}$-alkyl acrylate, ethylene/propylene, diene, and siloxane monomers mentioned for preparing the graft base B1.

Examples of suitable $C_{1-8}$-alkyl acrylates are in particular n-butyl acrylate and 2-ethylhexyl acrylate. Particularly suitable dienes are butadiene and isoprene. Examples of suitable siloxanes are hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane and octaphenylcyclotetrasiloxane, see DE-A 197 53 542.

Suitable siloxane elastomers (mostly termed silicone rubbers) have preferably been crosslinked. Suitable crosslinked silicone rubbers are generally those made from units of the formulae $R_2SiO$, $RSiO_{3/2}$, $R_3SiO_{1/2}$ and $SiO_{2/4}$, where R is a monovalent radical, and in the case of $R_3SiO_{1/2}$ is, where appropriate, also OH. The amounts of the individual siloxane units here are usually adjusted so that from 0 to 10 molar units of the formula $RSiO_{3/2}$, from 0 to 1.5 molar units of $R_3SiO_{1/2}$ and from 0 to 3 molar units of $SiO_{2/4}$ are present for every 100 units of the formula $R_2SiO$.

R here is generally $C_1$-$C_{18}$-alkyl, preferably $C_1$-$C_{12}$-alkyl, particularly preferably $C_1$-$C_6$-alkyl, such as methyl, ethyl, n-propyl, isopropyl, n-butyl, isobutyl, sec-butyl, tert-butyl, pentyl or hexyl, in particular methyl or ethyl, or $C_6$-$C_{10}$-aryl, such as phenyl or naphthyl, in particular phenyl, or $C_1$-$C_{10}$-alkoxy and aryloxy, e.g. methoxy, ethoxy or phenoxy, preferably methoxy, or groups susceptible to free-radical attack, e.g. vinyl, allyl, acrylic, acryloxy, methacrylic, methacryloxyalkyl, halo or mercapto groups, preferably vinyl or mercapto-$C_1$-$C_{10}$-alkyl radicals, in particular mercaptopropyl, vinyl and methacryloxypropyl.

In one particular embodiment, use is made of silicone rubbers in which at least 80% of all of the radicals R are methyl radicals. Preference is moreover given to silicone rubbers in which R is methyl and ethyl.

In another embodiment, use is made of silicone rubbers which contain amounts in the range from 0.01 to 10 mol %, preferably from 0.2 to 2 mol %, of the abovementioned groups susceptible to free-radical attack, based on all of the radicals R. These silicone rubbers are described by way of example in EP-A 260 558 and in EP-A 492 376.

The silicone rubbers described in DE-A 25 39 572 may moreover be used as resins, as may those disclosed in EP-A 370 347.

Suitable ethylene/propylene elastomers are prepared from ethylene and propylene (EPM rubber) or from ethylene, propylene and a diene (EPDM rubber), see also EP-A 163 411, EP-A 244 857). Preferred EP(D)M rubbers used are those whose glass transition temperature is in the range from −60 to −40° C. The rubbers have only a small number of double bonds, i.e. fewer than 20 double bonds per 1000 carbon atoms, in particular from 3 to 10 double bonds per 1000 carbon atoms. Examples of these rubbers are copolymers composed of ethylene and propylene, and also ethylene-propylene terpolymers. The latter are prepared via polymerization of at least 30% of ethylene, at lest 30% by weight of propylene and from 0.5 to 15% by weight of an unconjugated diolefinic component.

The tercomponent used generally comprises diolefins having at least 5 carbon atoms, e.g. 5-ethylidenenorbornene, dicyclopentadiene, 2,2,1-dicyclopentadiene and 1,4-hexadiene. Other suitable materials are polyalkylenamers, such as polypentenamers, polyoctenemers, polydodecanamers, or a mixture of these substances. Use may also be made of partially hydrogenated polybutadiene rubbers in which at least 70% of residual double bonds have been hydrogenated.

Among the abovementioned rubbers, use is particularly made of the ethylene-propylene copolymers, and also the ethylene-propylene terpolymers (EPDM rubbers). The Mooney viscosity $ML_{1-4}$ (100° C.) of EPDM rubbers is generally from 25 to 120. They are commercially available.

Graft polymers based on EP(D)M may be prepared by various methods. It is preferable to prepare a solution of the EP(D)M elastomer (rubber) in the monomer mixture and (where appropriate) inert solvents, and to carry out the graft reaction via free-radical initiators, such as azo compounds or peroxides, at relatively high temperatures. By way of example, mention may be made of the processes of DE-B 23 02 014 and DE-A 25 33 991. It is also possible to operate in suspension—as described in U.S. Pat. No. 4,202,948.

Preferred graft bases B1 are those which have been built up from b11) from 70 to 99.9% by weight, preferably from 69 to 79% by weight, of at least one alkyl acrylate B11 having from 1 to 8 carbon atoms in the alkyl radical, preferably n-butyl acrylate and/or 2-ethylhexyl acrylate, in particular n-butyl acrylate as sole alkyl acrylate, b12) from 0 to 30% by weight, in particular from 20 to 30% by weight, of another copolymerizable monoethylenically unsaturated monomer B12, such as butadiene, isoprene, styrene, acrylonitrile, methyl methacrylate or vinyl methyl ether, or a mixture of these, and, b13) from 0.1 to 5% by weight, preferably from 1 to 4% by weight, of a copolymerizable, polyfunctional, preferably bi- or trifunctional, crosslinking monomer B13, the entirety of B11, B12 and B13 giving 100% by weight.

Suitable bi- or polyfunctional crosslinking monomers B13 of this type are those which contain preferably two, where appropriate three or more, ethylenic double bonds capable of copolymerization and not 1,3-conjugated. Examples of suitable crosslinking monomers are divinylbenzene, diallyl maleate, diallyl fumarate, diallyl phthalate, triallyl cyanurate and triallyl isocyanurate. The acrylic ester of tricyclodecenyl alcohol has proven to be a particularly useful crosslinking polymer (cf. DE-A 12 60 135).

This type of graft base is known per se and described in the literature, for example in DE-A 31 49 358. A graft base B1 composed of the components B11, where appropriate B12, and B13 is also termed ASA rubber. Its preparation is known per se and is described by way of example in DE-A 28 26 925, DE-A 31 49 358 and DE-A 34 14 118.

Preferred grafts B2 are those in which B21 is styrene or α-methylstyrene or a mixture of these, and B22 is acrylonitrile or methacrylonitrile. Particularly preferred monomer mixtures are styrene and acrylonitrile or α-methylstyrene and acrylonitrile. The grafts B2 are obtainable by copolymerizing components B21 and B22 and, if appropriate, B23 in the presence of the graft bases B1. The graft B2 (graft shell) of the graft polymers may be built up in one or two stages.

Examples of other suitable monomers B23 capable of free-radical polymerization are acrylates, such as tert-butyl acrylate or glycidyl acrylate, and also the corresponding methacrylates.

The graft polymers B may be prepared by the method described in DE-C 12 60 135, for example.

The conditions selected for the graft polymerization are preferably such that the resultant particle sizes are from 50 to 700 nm ($d_{50}$ for the cumulative mass distribution). Measures for this purpose are known and described in DE-A 28 26 925, for example. A coarse-particle rubber dispersion may be prepared directly by the seed-latex process.

To obtain very tough products, it is frequently advantageous to use a mixture of at least two graft polymers with different particle sizes. To achieve this, the particles of the rubber are enlarged in a known manner, e.g. by agglomeration, to give the latex a bimodal structure (from 50 to 180 nm and from 200 to 700 nm).

Mixtures made from components A and B in which the latter comprises a coarse-particle and a fine-particle graft copolymer are described in DE-A 36 15 607, for example. Mixtures of components A and B where the latter has a two-stage graft shell are known from EP-A-0 111 260.

Component C

The amount of component C present in the molding compositions of the invention is from 1 to 97.5% by weight, preferably from 3.5 to 50% by weight, in particular from 4 to 40% by weight. It is preferably halogen-free.

According to the invention, the copolymer C has been made from c1) from 60 to 85% by weight, preferably from 70 to 83% by weight, of styrene or of substituted styrenes C1 of the formula I given above, or a mixture of these, and c2) from 15 to 40% by weight, preferably from 17 to 30% by weight, of at least one unsaturated nitrile C2, preferably acrylonitrile or methacrylonitrile or a mixture of these, the entirety of c1) and c2) being 100% by weight.

The copolymers C are resin-like, thermoplastic and rubber-free. Particularly preferred copolymers C are those made from styrene and acrylonitrile, made from α-methylstyrene and acrylonitrile, or made from styrene, α-methylstyrene and acrylonitrile. It is also possible for two or more of the copolymers described to be used simultaneously.

Copolymers of this type frequently arise as by-products during the graft polymerization to prepare component B, especially when large amounts of monomers are grafted onto small amounts of rubber.

The copolymers are known per se and can be prepared by free-radical polymerization, in particular emulsion polymerization, suspension polymerization, solution polymerization or bulk polymerization or precipitation polymerization, and generally have viscosity numbers VN of from 40 to 160 ml/g, determined to DIN 53727 on a 0.5% strength by weight solution in N,N-dimethylformamide (DMF) at 23° C. Details of these processes are given by way of example by R. Vieweg and G. Daumiller (ed.), Kunststoff-Handbuch, Vol. V "Polystyrol", pp. 118 et seq., Hanser-Verlag, Munich 1969.

Component D

The amount of component D present in the inventive molding compositions is from 0.5 to 50% by weight, preferably from 1 to 30% by weight and in particular from 1.5 to 25% by weight. It is a copolymer, obtainable via reaction of d1) from 5 to 95% by weight, preferably from 10 to 90% by weight and particularly preferably from 15 to 85% by weight, of at least one thermoplastic methacrylate polymer D1 containing at least one type of functional groups selected from epoxy, carboxy, hydroxy, anhydride and oxazoline, with d2) from 5 to 95% by weight, preferably from 10 to 90% by weight and particularly preferably from 15 to 85% by weight, of at least one thermoplastic polyester D2, where the entirety of d1) and d2) gives 100% by weight.

Component D acts as compatibilizer in molding compositions in which polycarbonates, graft polymers and styrene copolymers are present.

Component D1

The methacrylate monomers present in the thermoplastic methacrylate polymer D1 are preferably methyl methacrylate (MMA) or acrylates, or a mixture of these. MMa is particularly preferred.

The methacrylate polymer D1 is particularly preferably composed of d11) from 80 to 99.9% by weight, preferably from 85 to 99.3% by weight and in particular from 90 to 98.95 by weight of MMA (component D11), d12) from 0 to 19.9% by weight, preferably from 0.5 to 14.8% by weight and in particular from 0.6 to 9.5 by weight of at least one other acrylate or methacrylate D12, and d13) from 0.1 to 20% by weight, preferably from 0.2 to 15% by weight and in particular from 0.5 to 10% by weight, of at least one monomer D13 containing at least one type of functional groups selected from epoxy, carboxy, hydroxy, anhydride and oxazoline, where the entirety of d11), d12) and d13) gives 100% by weight.

The methacrylate polymer D1 therefore contains functional groups. When MMA is used as methacrylate monomer the term "reactive polymethyl methacrylate" ("reactive PMMA") is used. From the above it is apparent that the functional groups are preferably introduced into the polymer D1 via concomitant use of appropriate "reactive" monomers D13 which contain these groups, during the polymerization of the methacrylate monomers to give the polymer D1.

Examples of other arylates or methacrylates D12 which may be used concomitantly as comonomers are $C_1$-$C_{16}$-alkyl acrylates or $C_2$-$C_{16}$-alkyl methacrylates, e.g. methyl acrylate, ethyl acrylate, n-propyl acrylate, isopropyl acrylate, n-butyl acrylate, isobutyl acrylate, tert-butyl acrylate, n-hexyl acrylate, cyclohexyl acrylate, dodecyl acrylate, ethyl methylacrylate, n-propyl methylacrylate, isopropyl methylacrylate, n-butyl methylacrylate, tert-butyl methylacrylate, n-hexyl methylacrylate, cyclohexyl methylacrylate or dodecyl methacrylate.

By way of example, reactive monomers D13 which may be used are:

for the epoxy group: glycidyl methacrylate, isopropenyl glycidyl ether, allyl glycidyl ether, preferably glycidyl methacrylate;

for the carboxy group: acrylic acid, methacrylic acid, preferably acrylic acid;

for the hydroxy group: hydroxyalkyl acrylates, hydroxyalkyl methacrylates, preferably hydroxyethylhexyl acrylate;

for the anhydride group: carboxylic anhydrides, such as maleic anhydride;

for the oxazoline group: vinyl oxazoline, isopropenyl oxazoline, preferably vinyl oxazoline.

If the methacrylate polymer D1 is intended to contain various types of functional groups, use may be made of two or more reactive monomers D13.

In the polymers D1, the monomer units D11, D13, and also, where appropriate, D12 may have random distribution or have a blocked structure or tapered structure (where tapered means a gradient from D11-rich (D13-poor) toward D11-poor (D13-rich) or vice versa.

The average molar masses $M_w$ (weight-average) of the polymers D1 is usually from 30,000 to 500,000 g/mol, preferably from 40,000 to 450,000 g/mol, in particular from 45,000 to 300,000 g/mol.

The polymers D1 are prepared by known methods, e.g. via free-radical, group-transfer or anionic polymerization.

Free-radical polymerization is known and may by way of example take the form of a bulk, solution or bead polymerization. By way of example, it is described in the specifications NL-A 6605289, DE-A 12 31 013, DE-A 12 98 272, DE-A 36 31 826, JP-A 85/147417 and EP-A 457 147. Free-radical polymerization generally gives a rather broad molar mass distribution (weight-average/number-average ratio $M_w/M_n > 2$). Further details may also be found in Vieweg/Esser, Kunststoff-Handbuch, volume 9 "Polymethacrylate", Hanser-Verlag Munich 1975.

In contrast, anionic polymerization gives a rather narrow molar mass distribution ($M_w/M_n \leq 2$). Detailed descriptions of anionic polymerization are found, inter alia, in M. Swarcz, M. van Beylen: "Ionic Polymerization and Living Polymers", Chapman & Hall, New York, London 1993, pp. 120-130; M. Morton "Anionic Polymerization: Principles and Practice", Academic Press, New York, London, 1983, pp. 23-27; T. P. Davis, D. M. Haddleton and S. N. Richards, J. Macromol. Sci.-Rev. Macromol. Chem. Phys., C34, 243 (1994) and P. Teyssie, P. Bayard, R. Jerome, K. Varshney, J.-S. Wang, P. Heim and B. Vuillemin, Macromol. Symp., 98, 171 (1995). Another possible method is living-anionic polymerization of the monomers D11-D13 in the presence of polar aprotic solvents (in particular THF), using alkyllithium compounds as initiator at temperatures of from −120 and +20° C., preference being given to the range from −100 to −20° C.

Component D2

The thermoplastic polyester D2 is preferably aromatic or semiaromatic.

For the purposes of the present invention, an aromatic polyester excludes polycarbonates which can be used as component A. The aromatic polyesters derive from aromatic dihydroxy compounds from aromatic dicarboxylic acids, or from aromatic hydroxycarboxylic acids. Suitable aromatic dihydroxy compounds are the compounds of the formula I described above under A.

Among the preferred dihydroxy dompounds are dihydroxybiphenyl, di(hydroxyphenyl)alkanes, di(hydroxyphenyl)cycloalkanes, di(hydroxyphenyl)sulfide, di(hydroxyphenyl)ethers, di(hydroxyphenyl)sulfoxide, α,α'-di (hydroxyphenyl)dialkylbenzene, di(hydroxyphenyl)sulfone, di(hydroxybenzoyl)benzene, resorcinol and hydroquinone, and also ring-alkylated derivatives of these. Among these, preference is given to 4,4'-dihydroxybiphenyl, 2,4-di(4-hydroxyphenyl)-2-methylbutane, α,α'-di(4-hydroxyphenyl)-p-diisopropylbenzene, 2,2-di(3'-methyl-4'-hydroxyphenyl)propane or 2,2-di(3'-chloro-4'-hydroxyphenyl)propane, and also in particular to 2,2-di(4-hydroxyphenyl)propane, 2,2-di(3',5'-dichlorodihydroxyphenyl)propane, 1,1-di(4'-hydroxyphenyl)cyclohexane, 3,4-dihydroxybenzophenone, 4,4'-dihydroxydiphenyl sulfone or 2,2-di(3',5'-dimethyl-4'-hydroxyphenyl)propane or a mixture of these.

It is, of course, also possible to use mixtures of polyalkylene terephthalates entirely aromatic polyesters. These generally comprise from 20 to 98% by weight of the polyalkylene terephthalate and from 2 to 18% by weight of the entirely aromatic polyester.

The aromatic dicarboxylic acids generally have from 8 to 30 carbon atoms. The aromatic ring(s) may have substitution, e.g. by one or more $C_1$-$C_4$-alkyl radicals, such as methyl, ethyl, n-propyl, isopropyl, n-butyl, isobutyl or tert-butyl. Preferred aromatic dicarboxylic acids which may be mentioned are terephthalic acid, isophthalic acid or 2,6-naphthalenedicarboxylic acid. Preference is given to mixtures of from 5 to 100 mol % of isophthalic acid and from 0 to 95 mol % of terephthalic acid, in particular mixtures of from 20 to 50 mol % of isophthalic acid and from 50 to 80 mol % of terephthalic acid.

Semiaromatic polyesters are those based on aromatic dicarboxylic acids and on one, or on two or more different, aliphatic dihydroxy compound(s).

One group of preferred semiaromatic polyesters is that of polyalkylene terephthalates having from 2 to 10 carbon atoms in the alcohol moiety.

These polyalkylene terephthalates are known per se and are described in the literature. Their main chain contains an aromatic ring derived from the aromatic dicarboxylic acid as described above. These polyalkylene terephthalates may be prepared via reaction of aromatic dicarboxylic acids, of their esters, or of other ester-forming derivatives with aliphatic dihydroxy compounds in a manner known per se.

Preferred dicarboxylic acids which may be mentioned are 2,6-naphthalenedicarboxylic acid, terephthalic acid and isophthalic acid and mixtures of these. Up to 30 mol %, preferably not more than 10 mol %, of the aromatic dicarboxylic acids may have been replaced by aliphatic or cycloaliphatic dicarboxylic acids, such as adipic acid, azelaic acid, sebacic acid, dodecanedioic acids and cyclohexanedicarboxylic acids.

Among the aliphatic dihydroxy compounds, preference is given to diols having from 2 to 6 carbon atoms, in particular 1,2-ethanediol, 1,4-butanediol, 1,6-hexanediol, 1,4-hexanediol, 1,4-cyclohexanediol, 1,4-cyclohexanedimethylol and neopentyl glycol or their mixtures.

Particularly preferred semiaromatic polyesters which may be mentioned are polyalkylene terephthalates which derive from alkanediols having from 2 to 6 carbon atoms. Among these, particular preference is given to polyethylene terephthalate and polybutylene terephthalate or mixtures of these.

The viscosity number of the polyesters is generally in the range from 70 to 220, preferably from 100 to 150 (measured in a 0.5% strength by weight solution in a phenol/o-dichlorobenzene mixture (ratio 1:1 by weight at 25° C.).

Particular preference is given to polyesters whose carboxy end group content is up to 100 mval/kg, preferably up to 50 mval/kg and in particular up to 40 mval/kg of polyester. By way of example, these polyesters may be prepared by the process of DE-A 44 01 055. The carboxy end group content is usually determined via titration methods (e.g. potentiometry).

Reaction of Components D1 and D2 to Give the Copolymer D

The reaction of the methacrylate polymer D1 with the polyester D2 takes place either in advance, by separately reacting D1 and D2 with one another and mixing the resultant copolymer D with the other components A to C and, where appropriate, E to H to give the thermoplastic molding composition, or takes place in situ during the preparation of the molding compositions, by adding D1 and D2 to the other components of the molding composition, and accordingly delaying the formation of the copolymer D until blending of the molding composition takes place.

In the case of the separate reaction in advance, the preferred method of carrying out the reaction mixes the starting materials D1 and D2 with melting and keeps the mixture molten for a certain time (adequate for the chemical reaction between D1 and D2 to proceed) and, if required, mixes the materials.

In the case of the separate reaction, it is preferable to react D1 and D2 in an assembly for mixing melts. Examples of these assemblies for mixing melts are screw kneaders, such as single-screw kneaders (e.g. co-kneaders, single-screw extruders, in particular with mixing elements and shearing elements), twin-screw kneaders (e.g. twin-screw extruders of ZSK or ZE type, Kombiplast extruders, MPC twin-screw kneading mixers, FCM two-stage mixers, KEX kneading screw extruders, and gravity roller extruders). Kneaders with or without a ram are also suitable, as are trough kneaders and Banbury mixers. The person skilled in the art can find details, by way of example, in Saechtling (ed.), Kunststoff-Taschenbuch [Plastics Handbook], 27th edition, Carl Hanser Verlag Munich 1998, pp. 202-211.

The copolymer D is particularly preferably obtained by melt compounding of the methacrylate polymer D1 with the polyester D2.

D1 and D2 are usually reacted at temperatures from 230 to 300° C., preferably from 235 to 295° C. and in particular from 240 to 290° C. If use is made of assemblies for melt mixing, the above-mentioned temperatures are the temperatures of the mixing assemblies (extruders, kneaders, etc.).

The reaction times—in the case of assemblies for mixing melts the residence times—are usually from 0.5 to 30 min, preferably from 0.75 to 20 min and in particular from 1 to 10 min. Once the reaction has taken place, the melt is generally discharged in a known manner, cooled and pelletized.

In another embodiment, the method used for the separate reaction of D1 with D2 to give the copolymer D is solution or swelling of the starting materials D1 and D2 in suitable solvents or swelling agents, the resultant solutions or swollen substances then being brought into contact. By way of example, the solutions may be mixed at temperatures of from 10 to 200° C.

Examples of suitable solvents for the methacrylate polymer D1 and for the polyester D2 are halogenated alcohols, such as hexafluoroisopropanol (HFIP). Once the reaction has taken place, the solvents are usually removed, e.g. by means of a vented extruder.

In the case of the reaction in situ, the starting materials methacrylate polymer D1 and polyester D2 are mixed in a conventional manner with the components A to C and, if appropriate, E to H, as described at a later stage below under "Preparation of the molding compositions", forming the copolymer D.

The invention also provides compounds per se corresponding to the abovementioned component D.

Component E

Component E is present in the molding compositions of the invention in amounts of from 0 to 50% by weight, preferably from 0 to 45% by weight, in particular from 0 to 40% by weight.

Component E is fillers (also termed reinforcing materials). Use may in particular be made of particulate mineral fillers E1 and fibrous fillers E2. Use may be made of particulate mineral fillers E1 alone or fibrous fillers E2 alone.

The proportion of component E1 in the mixtures is preferably from 5 to 95% by weight and in particular from 5 to 90% by weight, and the proportion of component E2 is preferably from 5 to 95% by weight and in particular from 10 to 95% by weight, based on component E.

Suitable particulate mineral fillers E1 are amorphous silicas, carbonates, such as magnesium carbonate or chalk, powdered quartz, mica, a very wide variety of silicates, such as clays, muskovite, biotite, suzoite, tin maletite, talc, chlorite, phlogophite, feldspar, and calcium silicates, such as wollastonite, or kaolin, particularly calcined kaolin.

In one particularly preferred embodiment, use is made of particulate fillers in which at least 95% by weight, preferably at least 98% by weight, of the particles have a diameter (largest dimension), determined on the finished product, of below 45 μM, preferably below 40 μm, and an aspect ratio preferably within the range from 1 to 25, preferably within the range from 2 to 20, determined on the finished product, i.e. generally on an injection molding. The aspect ratio is the ratio of particle diameter to thickness (largest to smallest dimension).

An example of a method for determining the particle diameters here is to take electron micrographs of thin layers of the polymer mixture and to utilize at least 25 filler particles, preferably at least 50 filler particles, for the evaluation. The particle diameters may also be determined by sedimentation analysis as in Transactions of ASAE, p. 491 (1983). The proportion by weight of the fillers below 40 μm can also be measured by a screening-analysis method.

Particularly preferred particulate fillers E1 are talc, kaolin, such as calcined kaolin, wollastonite, or a mixture made from two or from all of these fillers. Particularly preferred among these is talc with a proportion of at least 95% by weight of particles with a diameter below 40 μm and with an aspect ratio of from 1.5 to 25, always determined on the finished product. Kaolin preferably has a proportion of at least 95% by weight of particles with a diameter below 20 μm, and with an aspect ratio of from 1.2 to 20, always determined on the finished product.

As component E2, use is made, for example, of fibrous fillers, such as carbon fibers, potassium titanate whiskers, aramid fibers, or preferably glass fibers. The glass fibers may have been coated with a size and/or with a coupling agent to improve compatibility with the polymer matrix. In a preferred embodiment at least 50% by weight of the fibrous fillers (glass fibers) have a length above 50 μm. The (glass) fibers used may preferably have a diameter of up to 25 μm, particularly preferably from 5 to 13 μm. It is preferable for at least 70% by weight of the glass fibers to have a length above 60 μm. It is particularly preferable for the average length of the glass fibers in the finished molding to be from 0.08 to 0.5 mm.

The length of the glass fibers is based on a finished molding, for example obtained by injection molding. When these glass fibers are added to the molding compositions their form may be that of short glass fibers cut to appropriate length or else that of continuous-filament strands (rovings). The form in which carbon fibers or glass fibers are used may also be that of fabrics, mats or glass silk rovings.

Component F

The amount of component F present in the molding compositions of the invention is from 0 to 2% by weight, preferably from 0 to 1.8% by weight, in particular from 0 (if present, from 0.1) to 1.5% by weight.

Component F is an organic acid, preferably of low molecular weight and preferably halogen-free.

For the purposes of the present invention, low-molecular-weight compounds include polynuclear compounds, for example compounds having up to five nuclei, in particular monomeric compounds.

The acids are preferably halogen-free, i.e. contain no halogens in their molecular skeleton. However, the invention does include acids which have small amounts of halogen-containing contamination. For the purposes of the present invention, acids include hydrates.

It is advantageous to use acids which at the processing temperatures used are involatile or at low volatility and, respectively, do not decompose or decompose only slightly at temperatures up to about 320° C.

The acids may contain one, two or more acid groups, for example up to ten acid groups.

It is preferable to use organic acids. Use may be made of either aromatic or else aliphatic acids. It is also possible to use aliphatic/aromatic acids. Preferred acids include mono-, di- and polycarboxylic acids, e.g. palmitic acid, stearic acid, benzoic acid and substituted benzoic acids, isophthalic acid, terephthalic acid, trimellitic acid, sulfonic acids, such as p-toluenesulfonic acid and aliphatic sulfonic acids, fumaric acid, citric acid, mandelic acid and tartaric acid.

It is particularly preferable to use citric acid or p-toluenesulfonic acid or a mixture of these, for example one in which the proportion by weight of the citric acid is from 1 to 99% by weight, preferably from 10 to 90% by weight, and that of the p-toluenesulfonic acid is correspondingly from 1 to 99% by weight, preferably from 10 to 90% by weight.

Component G

The amount of component G present in the molding compositions of the invention is from 0 to 25% by weight, preferably from 0 to 20% by weight, in particular from 0 (if present, from 0.2) to 15% by weight.

Component G is a halogen-free phosphorus compound.

Any of the known conventional phosphorus-containing flame retardants may be used as component G. It is preferable to use the flame retardants listed in DE-A-40 34 336 and/or those listed in EP-A 0 552 397. Examples of these are tris(2,6-dimethylphenyl) phosphate, triphenyl phosphate, tricresyl phosphate, diphenyl 2-ethylcresyl phosphate, diphenyl cresyl phosphate, tris(iso-propylphenyl) phosphate, and also bis(phenyl) 4-phenylphenyl phosphate, phenyl bis(4-phenylphenyl)phosphate, tris(4-phenylphenyl) phosphate, bis(phenyl)benzylphenyl phosphate, phenyl bis(benzylphenyl)phosphate, tris(benzylphenyl)phosphate, bisphenyl[1-phenylethyl]phenyl phosphate, phenyl bis[1-phenylethyl]phenyl phosphate, tris[(1-phenylethyl)phenyl] phosphate, bisphenyl(1-methyl-1-phenylethyl)phenyl phosphate, phenyl bis[(1-methyl-1-phenylethyl)phenyl] phosphate, tris[(1-methyl-1-phenylethyl)phenyl]phosphate, phenyl bis[4-(1-phenylethyl)-2,6-dimethylphenyl]phosphate, bisphenyl 2,4-dibenzylphenyl phosphate, bisphenyl 2,4-di(1-phenylethyl)phenyl phosphate, and bisphenyl 2,4-di(1-methyl-1-phenylethyl)phenyl phosphate. They may also be used in a mixture with triphenylphosphine oxide or tris(2,6-dimethylphenyl)phosphine oxide.

Preferred flame retardants however are resorcinol diphosphate and, correspondingly, higher oligomers, hydroquinone diphosphate and corresponding higher oligomers.

Reference may also be made to the compounds described in EP-A-0 103 230, EP-A-0 174 493, EP-A-0 206 058, EP-A-0 363 608 and EP-A-0 558 266.

Component H

The amount of component H used is from 0 to 45% by weight, preferably from 0 to 20% by weight, in particular from 0 (if present, from 0.4) to 10% by weight.

Component H is other additives.

Examples of other additives are processing aids, stabilizers and oxidation retarders, agents to inhibit decomposition caused by heat or by ultraviolet light, lubricants, mold-release agents, flame retardants, dyes, pigments and plasticizers. Their proportion is generally from 0 to 45% by weight, preferably from 0 to 20% by weight, in particular from 0 (if present, from 0.2) to 10% by weight, based on the total weight of the composition.

Pigments and dyes are generally present in amounts of from 0 to 4% by weight, preferably from 0 to 3.5% by weight and in particular from 0 (if present, from 0.5) to 3% by weight.

The pigments for pigmenting thermoplastics are well known (see, for example, R. Gächter and H. Müller, Taschenbuch der Kunststoffadditive, Carl Hanser Verlag, 1983, pp. 494-510). The first preferred group of pigments is that of white pigments, such as zinc oxide, zinc sulfide, white lead (2 $PbCO_3.Pb(OH)_2$), lithopones, antimony white and titanium dioxide. Of the two most commonly found crystalline forms of titanium dioxide (rutile and anatase) it is in particular the rutile form which is used for white coloration of the molding compositions of the invention.

Black color pigments which may be used according to the invention are iron oxide black ($Fe_3O_4$), spinel black ($Cu(Cr,Fe)_2O_4$), manganese black (a mixture of manganese dioxide, silicon oxide and iron oxide), cobalt black and antimony black, and also particularly preferably carbon black, mostly used in the form of furnace black or gas black (see in this connection G. Benzing, Pigmente für Anstrichmittel, Expert-Verlag (1988), p. 78 et seq.).

According to the invention, it is, of course, also possible to achieve particular shades by using inorganic non-black colored pigments, such as chromium oxide green, or organic non-black color pigments, such as azo pigments or phthalocyanines. Pigments of this type are widely available commercially.

It may moreover be advantageous to use a mixture of the pigments and, respectively, dyes mentioned, e.g. carbon black with copper phthalocyanines, since the dispersion of color in the thermoplastic generally becomes easier.

Examples of other suitable colorants are described in R. Gächter and H. Müller (eds.), Plastics Additives Handbook, 4$^{th}$ ed. 1993, Reprint November 1996, Hanser Verlag Munich, on pp. 647-676.

Mention should also be made of fluorescent plasticizers, e.g. bisbenzoxazoles, triazine phenylcoumarins, benzotriazol phenylcoumarins, naphthotriazol phenylcoumarins and bis(styryl)biphenyls. The book mentioned by Gächter and Müller (4th edition 1993) gives other examples on pp. 779-785.

Examples of oxidation retarders and heat stabilizers which may be added to the thermoplastic materials according to the invention are halides of metals of group I of the Periodic Table, e.g. sodium halides and lithium halides, where appropriate in combination with copper (I) halides, e.g. with chlorides, bromides or iodides. The halides, in particular of copper, may also contain electron-rich π ligands. Examples of copper complexes of this type are Cu halide complexes with, for example, triphenylphosphine. It is also possible to use zinc fluoride and zinc chloride. Use may also be made of sterically hindered phenols, hydroquinones, substituted representatives of this group, secondary aromatic amines, where appropriate in combination with phosphorus-containing acids and, respectively, salts of these, and mixtures of these compounds, preferably in concentrations up to 1% by weight, based on the weight of the mixture.

Examples of UV stabilizers are various substituted resorcinols, salicylates, benzotriazoles and benzophenones, which are usually used in amounts of up to 2% by weight.

Lubricants and mold-release agents, generally used in amounts of up to 1% by weight of the thermoplastic material, are stearic acid, stearyl alcohol, alkyl stearates and stearamides, and also esters of pentaerythritol with long-chain fatty acids. It is also possible to use the stearates of calcium, of zinc or of aluminum, or else dialkyl ketones, e.g. distearyl ketone. Use may moreover be made of ethylene oxide-propylene oxide copolymers as lubricants and mold-release agents.

It is particularly advantageous to use UV stabilizers and heat stabilizers for polycarbonate and styrene copolymers. Examples of suitable stabilizers are also listed in DE-A-44 19 897. Transesterification inhibitors may also be present, for example phosphates, phosphites or phosphonites.

Preparation of the Molding Compositions

The thermoplastic molding compositions of the invention are prepared by processes known per se, by mixing the components. It may be advantageous to premix individual components. It is also possible for the components to be mixed in solution, with removal of the solvents. Examples of suitable organic solvents are chlorobenzene, mixtures of chlorobenzene and methylene chloride, and mixtures of chlorobenzene and aromatic hydrocarbons, such as toluene. It is preferable to work without chlorinated solvents. One way of concentrating the solvent mixtures by evaporation is to use vented extruders.

Any known method may be used to mix the (for example dry) components A to D and, where appropriate, E to H—or in the case of the abovementioned preparation of the copolymer D in situ, to mix components A, B, C, D1 and D2 and, if appropriate, E to H. It is preferable to mix at 200 to 320° C. by joint extrusion, kneading or roll-milling of the components, the components having been isolated in advance, where appropriate, from the solution obtained during the polymerization, or from the aqueous dispersion.

A process for preparing the molding compositions of the invention has therefore also been found, by mixing the dry components A to D (or D1 and D2) and, where appropriate, E to H at from 200 to 320° C.

The thermoplastic molding compositions of the invention may be processed by known methods of thermoplastic processing, for example by extrusion, injection molding, calendering, blow molding or sintering.

The molding compositions of the invention may be used to produce moldings, fibers or films. They may moreover particularly preferably be used to produce bodywork parts.

The molding compositions are particularly suitable for producing bodywork parts (e.g. in the automotive sector), in particular for producing large-surface-area exterior bodywork parts, such as heel surrounds, hatchback doors, front hoods, etc.

The invention also provides corresponding moldings, fibers or films, and also bodywork parts.

The invention also provides the use of copolymers D as defined above as compatibilizer in molding compositions in which polycarbonates, graft polymers and styrene copolymers are resent.

The molding compositions of the invention, and also moldings, fibers, and films have high stiffness and good toughness. The effect of the processing conditions on the moldings produced from the inventive molding compositions is very small, and the undesired anisotropy of mechanical properties has been reduced. Susceptibility to delamination has likewise been advantageously reduced.

The examples below give further illustration of the invention.

EXAMPLES

The median particle size and the particle size distribution were determined from the cumulative weight distribution, using a specimen which had been ashed and dispersed by ultrasound. The median particle sizes are in all cases the ponderal median particle sizes, as determined using an analytical ultracentrifuge and the method of W. Scholtan and H. Lange, Kolloid-Z, and Z.-Polymere 250 (1972), pp. 782-796. The ultracentrifuge measurement gives the cumulative weight distribution of the particle diameter in a specimen. From this it can be deduced what percentage by weight of the particles has a diameter smaller than or equal to a particular size. The median particle diameter, also termed the $d_{50}$ of the cumulative weight distribution, is defined here as that particle diameter at which the diameter of 50% by weight of the particles is smaller than the diameter corresponding to the $d_{50}$. Similarly, the diameter of 50% by weight of the particles is then greater than the $d_{50}$. To describe the breadth of the particle size distribution of the rubber particles, the $d_{10}$ and $d_{90}$ deriving from the cumulative weight distribution are utilized alongside the $d_{50}$ (median particle diameter). The definitions here for the $d_{10}$ and, respectively, $d_{90}$ of the cumulative mass distribution are analogous to the $d_{50}$, but refer to 10 and, respectively, 90% by weight of the particles. The quotient $Q=(d_{90}-d_{10})/d_{50}$ is a measure of the breadth of distribution of particle size.

The following components were used:

A: A commercially available polycarbonate based on bisphenol A, with a viscosity number $VN_A$ of 61.3 ml/g, measured on a 0.5% strength by weight solution in methylene chloride at 23° C.

B1: A fine-particle graft polymer prepared from
  b1) 16 g of butyl acrylate and 0.4 g of tricyclodecenyl acrylate, which had been heated to 60° C. in 150 g of water with addition of 1 g of the sodium salt of a $C_{13}$-$C_{18}$ paraffinsulfonic acid, 0.3 g of potassium persulfate, 0.3 g of sodium hydrogencarbonate and 0.15 g of sodium pyrophosphate, with stirring. 10 minutes after the start of the polymerization reaction, and within a period of 3 hours, a mixture made from 82 g of butyl acrylate and 1.6 g of tricyclodecenyl acrylate was added. Once monomer addition had ended, stirring was continued for one hour. The resultant latex of the crosslinked butyl acrylate polymer had a solids content of 40% by weight, the median particle size (ponderal median) was determined as 76 nm, and the particle size distribution was narrow (quotient Q=0.29).
  b2) 150 g of the polybutyl acrylate latex obtained as in b1) were mixed with 40 g of a mixture made from styrene and acrylonitrile (weight ratio 75:25) and with 60 g of water, and heated at 65° C. for 4 hours, with stirring, after addition of a further 0.03 g of potassium persulfate and 0.05 g of lauroyl peroxide. Once the graft copolymerization had ended, the polymerization product was precipitated from the dispersion by calcium chloride solution at 95° C., washed with water and dried in a stream of warm air. The degree of grafting of the graft copolymer was 35%, and the particle size was 91 nm.

B2: A coarse-particle graft polymer prepared as follows:

b3) The following materials were added at 60° C. over the course of 3 hours to an initial charge made from 1.5 g of the latex prepared as in b1, and following addition of 50 g of water and 0.1 g of potassium persulfate: firstly a mixture made from 49 g of butyl acrylate and 1 g of tricyclodecenyl acrylate, and secondly a solution of 0.5 g of the sodium salt of a $C_{12}$-$C_{18}$ paraffinsulfonic acid in 25 g of water. Polymerization was then continued for 2 hours. The resultant latex of the crosslinked butyl acrylate polymer had a solids content of 40%. The median particle size (ponderal median) of the latex was determined as 430 nm, and the particle size distribution was narrow (Q=0.1).

b4) 150 g of the latex prepared as in b3 were mixed with 20 g of styrene and with 60 g of water, and heated for 3 hours at 65° C., with stirring, after addition of a further 0.03 g of potassium persulfate and 0.05 g of lauroyl peroxide. The dispersion obtained during this graft copolymerization was then polymerized for a further 4 hours with 20 g of a mixture made from styrene and acrylonitrile in a weight ratio of 75:25. The reaction product was then precipitated from the dispersion by a calcium chloride solution at 95° C., isolated, washed with water and dried in a stream of warm air. The degree of grafting of the graft copolymer was determined as 35%, and the median particle size of the latex particles was 510 nm.

C: A copolymer made from 81% by weight of styrene and 19% by weight of acrylonitrile, prepared via continuous solution polymerization, as described in Kunststoff-Handbuch [Plastics Handbook], ed. R. Vieweg and G. Daumiller, volume 5 "Polystyrol" [Polystyrene], Hanser-Verlag, Munich 1969 on p. 122-124. The viscosity number (measured to DIN 53727 on a 0.5% strength by weight solution in dimethylformamide at 23° C.) was 72 ml/g, corresponding to a weight-average molar mass of 174,000 g/mol.

D: A copolymer prepared via melt compounding of
d1) 50% by weight of a methacrylate polymer D1 made from
d11) 93% by weight of MMA
d12) 2% by weight of n-butyl acrylate, and
d13) 5% by weight of glycidyl acrylate,
(where the viscosity number of D1 was 66 ml/g, measured on a 0.5% strength by weight solution in chloroform at 23° C. to DIN 53727), and
d2) 50% by weight of polybutylene terephthalate polyester D2 (using Ultradur® B 4520 from BASF; the viscosity number of D2 was 130 ml/g, measured on a 0.5% strength by weight solution in a 1:1 mixture of phenol and o-chlorobenzene at 25° C. to ISO 1183).

For melt compounding use was made of a ZSK 30 single-/twin-screw extruder from Werner & Pfleiderer. The extruder temperature was 250° C. and the residence time was 2 min.

Dc: A product of reaction of a styrene-acrylonitrile copolymer modified with oxazoline groups with a polybutylene terephthalate as described in DE-A 19959420, p. 8, lines 62-66 (for comparison).

E1: IT-Extra talc, manufactured by Norwegian Talc, $d_{10}$=1.7 µm, $d_{90}$=10.82 µm [determined by laser diffraction, for which the talc was suspended in a suspension cell, with a 99% strength demineralized water/1% strength CV-K8 surfactant mixture (marketed by: CV-Chemievertrieb, Hanover) (magnetic stirrer, rotation rate 60 min$^{-1}$)], and the talc content of the suspension was $1 \cdot 10^{-4}$ g/ml, the pH being 8.5.

E2: Glass fiber with an epoxysilane size and with a fiber diameter of 10 µm and a staple length of 4.5 mm (e.g. PPG 3786 from PPG Industries).

Fiber lengths were determined as follows: the average length (number-average) of the fibers was determined on the residue from ashing of moldings. To this end, the residue from ashing was suspended in Zeiss immersion oil. To provide reliable discrimination between the filler particles and the fibers, the length of at least 100 fibers was determined manually and used to calculate the average.

F: Citric acid hydrate, purity 99%, from Aldrich.

H: A high-molecular-weight multicomponent ester with a viscosity of from 110 to 150 mPa*s at 80° C. (Loxiole® 70S from Henkel).

Preparation of the Thermoplastic Molding Compositions

Components A to H were mixed in a twin-screw extruder (ZSK 30 from Werner & Pfleiderer) at from 250 to 280° C., extruded, cooled and pelletized.

The dried pellets were processed at from 260 to 280° C. melt temperature to give standard small specimens, ISO test specimens, disks (60 mm diameter, 3 mm thickness), tensile specimens and sheets of dimensions 1200×300×3 mm, the mold surface temperature always being 80° C.

The Vicat B heat distortion temperature of the specimens was determined from the Vicat softening point determined on standard small specimens to DIN 53 460, Method B, using a force of 49.05 N and a temperature rise of 50 K per hour.

The flowability of the molding compositions was determined as melt volume index (MVI) to DIN 53 735 at 260° C. with 5 kg load.

Modulus of elasticity was determined to ISO 527 on tensile specimens by tensile testing at 23° C.

Fracture behavior was tested by the puncture test to DIN 53 443 at −30° C., in the form of the fracture energy $W_s$ for sheets of 1200×300×3 mm (penetration energy).

Notch impact strength $a_k$ was tested to ISO 179 1eA at 23° C., on ISO specimens. To test the anisotropy of mechanical properties, ISO test specimens were cut out from the sheets, parallel to and perpendicular to the direction of flow (direction of flow of the polymer melt in the injection mold), and the "$a_K$ parallel" and "$a_K$ perpendicular" values were determined on the ISO test specimens. The smaller difference $\Delta a_K = a_K$ perpendicular−$a_K$ parallel, the smaller was the anisotropy.

Steam jet test: a steam jet test was used to test painted test specimens for delamination. For this, plaques (60×60×3 mm) were sawn from the large sheet (1200×300×3 mm) in the vicinity of the gate. These plaques were painted in the usual way using an off-line painting system (primer 78566, undercoat 75803 and clear lacquer 76562, all from the company Wörwag, Stuttgart, Germany). The steam-jet test was carried out to the DaimlerChrysler Standard DBL 5416, by first using a screwdriver to scratch a cross on to the painted plaques. The scratch thus introduced penetrated the paint layer and extended into the plastic substrate. A steam jet machine was then used to direct a fan-shaped water jet for 60 sec on to the crack, the water temperature being 60° C. and the water pressure 70 bar. The distance between the painted plaque and the nozzle head of the steam-jet machine was 10 cm. The test was considered to be passed if the lateral extension of the crack brought about by exposure to the water jet was less than 1 mm in every direction. Key:
D: Delamination of 1 mm or more, i.e. material and/or paint flaked off
OK: Acceptable, i.e. no flaking-off of material or paint, or less than 1 mm.

The makeups and properties of the molding compositions are found in the tables below. c means for comparison,— means not present or not determined.

Calculated $\Delta a_K = a_K$ perpendicular$-a_K$ parallel.

TABLE 1

Makeups of molding compositions [parts by weight]

| | Example | | | | | | |
|---|---|---|---|---|---|---|---|
| | 1c | 2c | 3 | 4c | 5c | 6 | 7 |
| A | 60 | 57.5 | 57.5 | 65 | 62.5 | 62.5 | 62.5 |
| B1 | 10 | 10 | 10 | 6 | 6 | 6 | 6 |
| B2 | 10 | 10 | 10 | 6 | 6 | 6 | 6 |
| C | 20 | 17.5 | 17.5 | 11 | 8.5 | 8.5 | 8.5 |
| D | — | — | 5 | — | — | 5 | 5 |
| Dc | — | 5 | — | — | 5 | — | — |
| E1 | — | — | — | 12 | 12 | 12 | 11 |
| E2 | — | — | — | — | — | — | 1 |
| F | — | — | — | 0.2 | 0.2 | 0.2 | 0.2 |
| H | 0.5 | 0.5 | 0.5 | 0.5 | 0.5 | 0.5 | 0.5 |

TABLE 2

Properties of molding compositions

| | Example | | | | | | |
|---|---|---|---|---|---|---|---|
| | 1c | 2c | 3 | 4c | 5c | 6 | 7 |
| Vicat B [° C.] | 122 | 120 | 121 | 135 | 133 | 133 | 133 |
| Penetration energy $W_s$ at $-30°$ C. [Nm] | 75 | 87 | 86 | 69 | 77 | 79 | 68 |
| MVI [ml/10 min] | 13 | 13 | 15 | 9 | 8 | 11 | 11 |
| Modulus of elasticity [N/mm$^2$] | 2420 | 2340 | 2480 | 3350 | 3260 | 3400 | 3460 |
| $a_K$ perpendicular [kJ/m$^2$] | 85 | 87 | 89 | 43 | 44 | 46 | 34 |
| $a_K$ parallel [kJ/m$^2$] | 41 | 70 | 72 | 19 | 32 | 34 | 25 |
| $\Delta a_K$ [kJ/m$^2$] | 44 | 17 | 17 | 24 | 12 | 12 | 9 |
| Steam jet test | D | D | iO | D | iO | iO | iO |

Examples 1c to 3 relate to unfilled molding compositions which differ in component D. Non-inventive molding compositions without component D (example 1c) exhibited markedly poorer penetration energy $W_s$ and considerably greater anisotropy ($\Delta a_K$), when comparison is made with each of examples 2c and 3. The steam jet test was not passed, i.e. the moldings delaminated. Non-inventive molding compositions with a component Dc of DE-A 19959420 (example 2c) had thermal and mechanical properties similar to those of the inventive example 3, but the steam jet test was not passed. In addition, examples 1c and 2c exhibited poorer flowability (MVI) than the inventive example 3.

Only the inventive molding compositions (example 3) simultaneously exhibited good thermal and, respectively, mechanical properties—high heat resistance (Vicat B), good flowability (MVI), good stiffness (modulus of elasticity), high toughness ($W_s$)—low anisotropy ($\Delta a_K$) and lack of delamination (steam jet test passed).

Examples 4c to 6 relate to talc-filled molding compositions which in turn differ in component D. Again, when comparison is made with example 5c or 6, non-inventive molding compositions without component D (example 3c) exhibited poorer penetration energy $W_s$ and greater anisotropy ($\Delta a_K$), and they also delaminated. Non-inventive molding compositions with component Dc exhibited significantly poorer flowability (MVI) and therefore have less suitability for the injection molding of large moldings, e.g. hatchback doors.

Only the inventive molding compositions (example 6) exhibited the advantageous property profile described for example 3.

Example 7 in particular shows that the inventive component D is effective in reducing anisotropy of mechanical properties: it comprises not only (particulate) talc but also glass fibers as filler E. Although these fillers exacerbate anisotropy, the $\Delta a_K$ value for the inventive molding composition ex. 7 is actually smaller than that for ex. 6.

The examples show that only the inventive composition reliably provides the advantageous and improved property profile of the molding compositions.

The invention claimed is:
1. A thermoplastic molding composition comprising components A, B, C and D, and also, where appropriate, E, F, G and H, the entirety of which gives 100% by weight:
   A) from 1 to 97.5% by weight of at least one aromatic polycarbonate A,
   B) from 1 to 97.5% by weight of at least one graft polymer B made from
      b1) from 40 to 80% by weight of a graft base made from an elastomeric polymer B1 based on alkyl acrylates having from 1 to 8 carbon atoms in the alkyl radical, on ethylene-propylene, on dienes, or on siloxanes, and having a glass transition temperature below 0° C.,
      b2) from 20 to 60% by weight of a graft B2 made from
         b21) from 60 to 95% by weight of styrene or of substituted styrenes B21 of the formula I

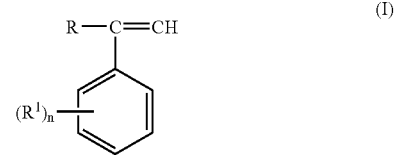

where R is $C_{1-8}$-alkyl or hydrogen and $R^1$ is $C_{1-8}$-alkyl and n is 1, 2 or 3, or a mixture of these, and
         b22) from 5 to 40% by weight of at least one unsaturated nitrile B22,
   C) from 1 to 97.5% by weight of at least one thermoplastic copolymer C made from
      c1) from 60 to 85% by weight of styrene or of substituted styrenes C1 of the formula I, or a mixture of these compounds, and
      c2) from 15 to 40% by weight of at least one unsaturated nitrile C2, D) from 0.5 to 50% by weight of at least one copolymer D, obtained by reacting
   d1) from 5 to 95% by weight of at least one thermoplastic polymer D1 consisting of methacrylate, and optionally acrylate units, and at least one type of functional groups selected from the group consisting of epoxy, carboxy, hydroxy, anhydride and oxazoline, with
   d2) from 5 to 95% by weight of at least one thermoplastic polyester D2,
E) from 0 to 40% by weight of at least one filler E,
F) from 0 to 2% by weight of at least one organic acid F,
G) from 0 to 25% by weight of at least one halogen-free phosphorus compound G,
H) from 0 to 45% by weight of other additives H.

2. A molding composition as claimed in claim 1, where the polycarbonates A are based on biphenols of the formula II

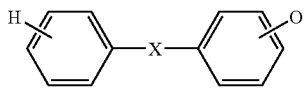

where X is a single bond, $C_{1-3}$-alkylene, $C_2$-$C_3$-alkylidene, $C_{3-6}$-cycloalkylidene, or else —S— or —$SO_2$—.

3. A molding composition as claimed in claim 1, where the graft base B1 of the graft copolymer B is composed of
   b11) from 70 to 99.9% by weight of at least one alkyl acrylate B11 having from 1 to 8 carbon atoms in the alkyl radical,
   b12) from 0 to 30% by weight of another copolymerizable monoethylenically unsaturated monomer B12, or a mixture of these,
   b13) from 0.1 to 5% by weight of a copolymerizable, polyfunctional crosslinking monomer B13,
   where the entirety of B11, B12 and B13 gives 100% by weight.

4. A molding composition as claimed in claim 1, where the copolymer C is composed of from 70 to 83% by weight of styrene and from 17 to 30% by weight of acrylonitrile.

5. A molding composition as claimed in claim 1, where the copolymer D is reacted by melt compounding of the methacrylate polymers D1 with the polyester D2.

6. A molding composition as claimed in claim 1, where the filler E is selected from the group consisting of particulate mineral fillers, fibrous fillers, and mixtures of these.

7. A process for preparing the molding composition defined in claim 1 which comprises mixing the dry components A to D and, where appropriate, E to H at from 200 to 320° C.

8. A bodywork part based on moldings made from the molding composition defined in claim 1.

9. A molding, a fiber, or a film, made from the molding composition defined in claim 1.

10. A molding composition as claimed in claim 1, wherein the thermoplastic methacrylate polymer D1 comprises from 80 to 99.9% by weight of methyl methacrylate.

11. A molding composition comprising components A, B, C and D, and also, where appropriate, E, F, G and H, the entirety of which gives 100% by weight:
   A) from 1 to 97.5% by weight of at least one aromatic polycarbonate A,
   B) from 1 to 97.5% by weight of at least one graft polymer B made from
      b1) from 40 to 80% by weight of a graft base made from an elastomeric polymer B1 based on alkyl acrylates having from 1 to 8 carbon atoms in the alkyl radical, on ethylene-propylene, on dienes, or on siloxanes, and having a glass transition temperature below 0° C.,
      b2) from 20 to 60% by weight of a graft B2 made from
      b21) from 60 to 95% by weight of styrene or of substituted styrenes B21 of the formula I

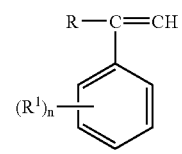

where R is $C_{1-8}$-alkyl or hydrogen and $R^1$ is $C_{1-8}$-alkyl and n is 1, 2 or 3, or a mixture of these, and
      b22) from 5 to 40% by weight of at least one unsaturated nitrile B22,
   C) from 1 to 97.5% by weight of at least one thermoplastic copolymer C made from
      c1) from 60 to 85% by weight of styrene or of substituted styrenes C1 of the formula I, or a mixture of these compounds, and
      c2) from 15 to 40% by weight of at least one unsaturated nitrile C2,
   D) from 0.5 to 50% by weight of at least one copolymer D, obtained by reacting
      d1) from 5 to 95% by weight of at least one thermoplastic methacrylate polymer D1 containing at least one type of functional group selected from the group consisting of epoxy, carboxy, hydroxy, anhydride and oxazoline, with
      d2) from 5 to 95% by weight of at least one thermoplastic polyester D2,
   E) from 0 to 40% by weight of at least one filler E,
   F) from 0 to 2% by weight of at least one organic acid F,
   G) from 0 to 25% by weight of at least one halogen-free phosphorus compound G,
   H) from 0 to 45% by weight of other additives H
   where the methacrylate polymer Dl is composed of
      d11) from 80 to 99.9% by weight of methyl methacrylate D11,
      d12) from 0 to 19.9% by weight of at least one other acrylate or methacrylate D12, and
      d13) from 0.1 to 10% by weight of at least one monomer D13, containing at least one type of functional groups selected from epoxy, carboxy, hydroxy, anhydride and oxazoline,
   where the entirety of D11, D12 and D13 gives 100% by weight.

12. A molding composition as claimed in claim 11 where the monomer D13 used comprises glycidyl methacrylate, allyl glycidyl ether, isopropenyl glycidyl ether, or a mixture of these.

13. A molding composition as claimed in claim 11, where the polycarbonates A are based on biphenols of the formula II

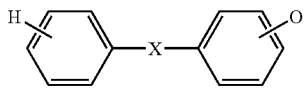

where X is a single bond, $C_{1-3}$-alkylene, $C_2$-$C_3$-alkylidene, $C_{3-6}$-cycloalkylidene, or else —S— or —SO$_2$—.

14. A molding composition as claimed in claim 11, where the graft base B1 of the graft copolymer B is composed of
 b11) from 70 to 99.9% by weight of at least one alkyl acrylate B11 having from 1 to 8 carbon atoms in the alkyl radical,
 b12) from 0 to 30% by weight of another copolymerizable monoethylenically unsaturated monomer B12, or a mixture of these,
 b13) from 0.1 to 5% by weight of a copolymerizable, polyfunctional crosslinking monomer B13,
 where the entirety of B11, B12 and B13 gives 100% by weight.

15. A molding composition as claimed in claim 11, where the copolymer C is composed of from 70 to 83% by weight of styrene and from 17 to 30% by weight of acrylonitrile.

16. A molding composition as claimed in claim 11, where the copolymer D is obtained by melt compounding of the methacrylate polymers D1 with the polyester D2.

17. A molding composition as claimed in claim 11, where the filler E is selected from the group consisting of particulate mineral fillers, fibrous fillers, and mixtures of these.

18. A process for preparing the molding composition defined in claim 11, which comprises mixing the dry components A to D and, where appropriate, E to H at from 200 to 312° C.

19. A bodywork part based on moldings made from the molding composition defined in claim 11.

20. A molding, a fiber, or a film, made from the molding composition defined in claim 11.

21. A thermoplastic molding composition comprising components A, B, C and D, and also, where appropriate, E, F, G and H, the entirety of which gives 100% by weight:
 A) from 1 to 97.5% by weight of at least one aromatic polycarbonate A,
 B) from 1 to 97.5% by weight of at least one graft polymer B made from
  b1) from 40 to 80% by weight of a graft base made from an elastomeric polymer B1 based on alkyl acrylates having from 1 to 8 carbon atoms in the alkyl radical, on ethylene-propylene, on dienes, or on siloxanes, and having a glass transition temperature below 0° C.,
  b2) from 20 to 60% by weight of a graft B2 made from
  b21) from 60 to 95% by weight of styrene or of substituted styrenes B21 of the formula I

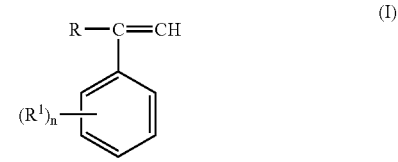

where R is $C_{1-8}$-alkyl or hydrogen and $R^1$ is $C_{1-8}$-alkyl and n is 1, 2 or 3, or a mixture of these, and
  b22) from 5 to 40% by weight of at least one unsaturated nitrile B22,
 C) from 1 to 97.5% by weight of at least one thermoplastic copolymer C made from
  c1) from 60 to 85% by weight of styrene or of substituted styrenes C1 of the formula I, or a mixture of these compounds, and
  c2) from 15 to 40% by weight of at least one unsaturated nitrile C2,
 D) from 0.5 to 50% by weight of at least one copolymer D, obtained by reacting
  d1) from 5 to 95% by weight of at least one thermoplastic polymer D1 comprising from 80 to 99.9% by weight of methacrylate, and containing at least one type of functional group selected from the group consisting of epoxy, carboxy, hydroxy, anhydride and oxazoline, with
  d2) from 5 to 95% by weight of at least one thermoplastic polyester D2,
 E) from 0 to 40% by weight of at least one filler E,
 F) from 0 to 2% by weight of at least one organic acid F,
 G) from 0 to 25% by weight of at least one halogen-free phosphorus compound G,
 H) from 0 to 45% by weight of other additives H.

* * * * *

UNITED STATES PATENT AND TRADEMARK OFFICE
CERTIFICATE OF CORRECTION

PATENT NO. : 7,265,172 B2 Page 1 of 1
APPLICATION NO. : 10/510478
DATED : September 4, 2007
INVENTOR(S) : Weber et al.

It is certified that error appears in the above-identified patent and that said Letters Patent is hereby corrected as shown below:

In Claim 18, column 23, indicated line 33: "312°C" should read --320°C--

Signed and Sealed this

Twentieth Day of November, 2007

JON W. DUDAS
*Director of the United States Patent and Trademark Office*